June 17, 1930.   J. R. REPLOGLE   1,764,749
CONTROL MECHANISM FOR MECHANICAL REFRIGERATING APPARATUS
Original Filed June 6, 1921   3 Sheets-Sheet 1

INVENTOR.
John R. Replogle.
BY
Hart & Lind
ATTORNEYS.

June 17, 1930.  J. R. REPLOGLE  1,764,749

CONTROL MECHANISM FOR MECHANICAL REFRIGERATING APPARATUS

Original Filed June 6, 1921   3 Sheets-Sheet 3

Inventor
John R. Replogle.
BY
Hart & Lind
ATTORNEYS

Patented June 17, 1930

1,764,749

UNITED STATES PATENT OFFICE

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN

CONTROL MECHANISM FOR MECHANICAL REFRIGERATING APPARATUS

Original application filed June 6, 1921, Serial No. 475,344, and in Canada February 11, 1922. Divided and this application filed November 3, 1927. Serial No. 230,745.

This invention relates to control mechanism, and more particularly to control mechanism for mechanical refrigerating apparatus, the present application being a division of my co-pending application, Serial No. 475,344, filed June 6, 1921.

An object of my invention is to provide automatically operated switch mechanism which is responsive to definite pressures in both the high and low side of a refrigerating system to control a compressor operating motor.

Another object of my invention is to provide mechanism in a pressure control device for mechanical refrigerating apparatus which can be readily adjusted to vary its effect upon electric switch mechanism.

A further object of my invention is to provide motion transmitting mechanism for a pressure operated switch operating device which can be adjusted to actuate the switch at pre-determined temperatures.

Another object of my invention is to provide automatic switch operating mechanism, for the electrical circuit of a motor for mechanical refrigerating apparatus, in which mechanism operated by excessive pressure and mechanism actuated by normal predetermined pressures will actuate the switch through a common mechanism to start and stop the motor under desired pressures and to stop the motor under excessive pressure.

Other objects of the invention, more or less incidental or ancillary to the foregoing, will appear in the following description which sets forth, in connection with the accompanying drawing, a preferred embodiment of the invention.

Figure 1:
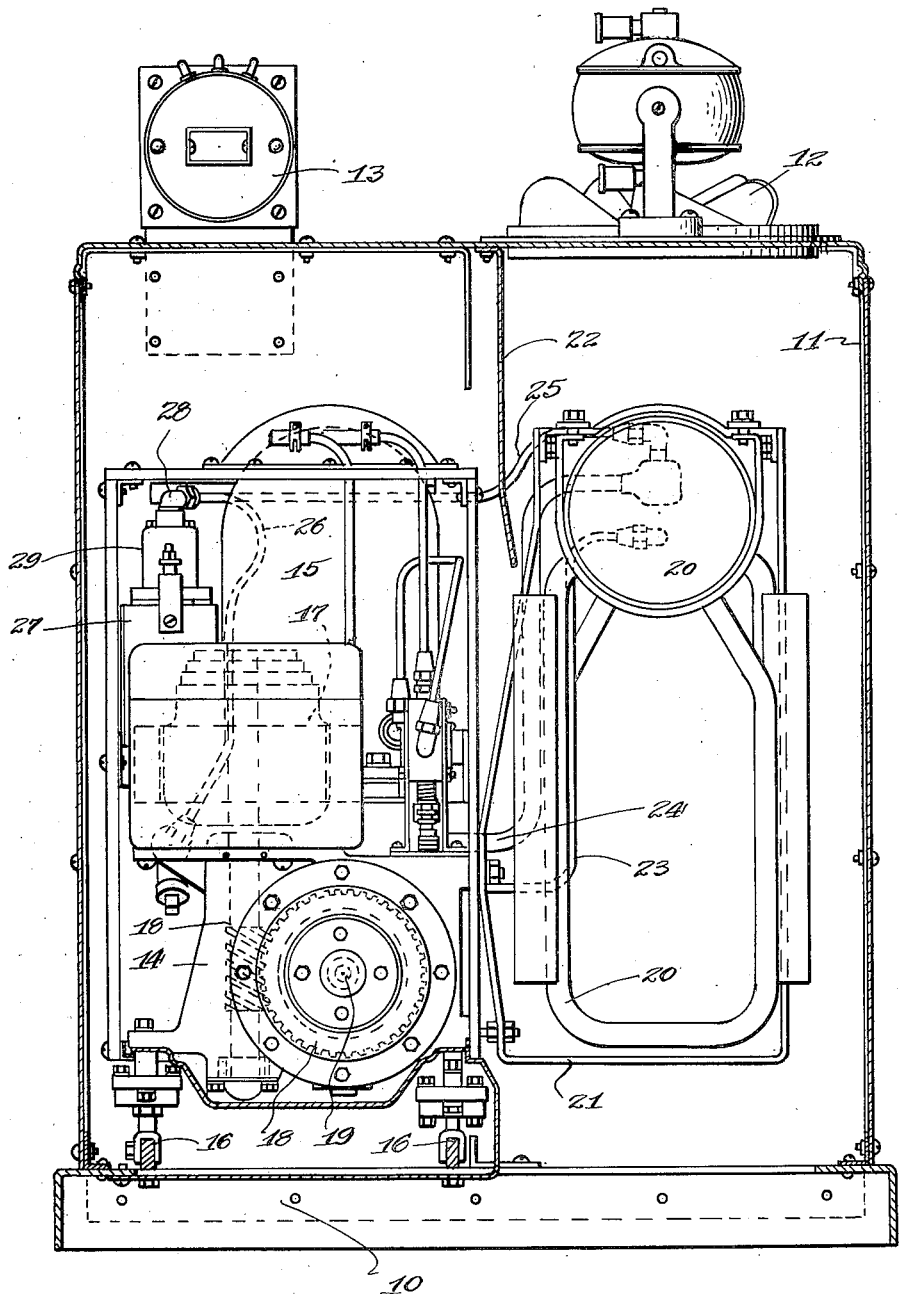
Figure 1 is an end view of a unitary refrigerating mechanism with which my invention is incorporated.
Figure 2:
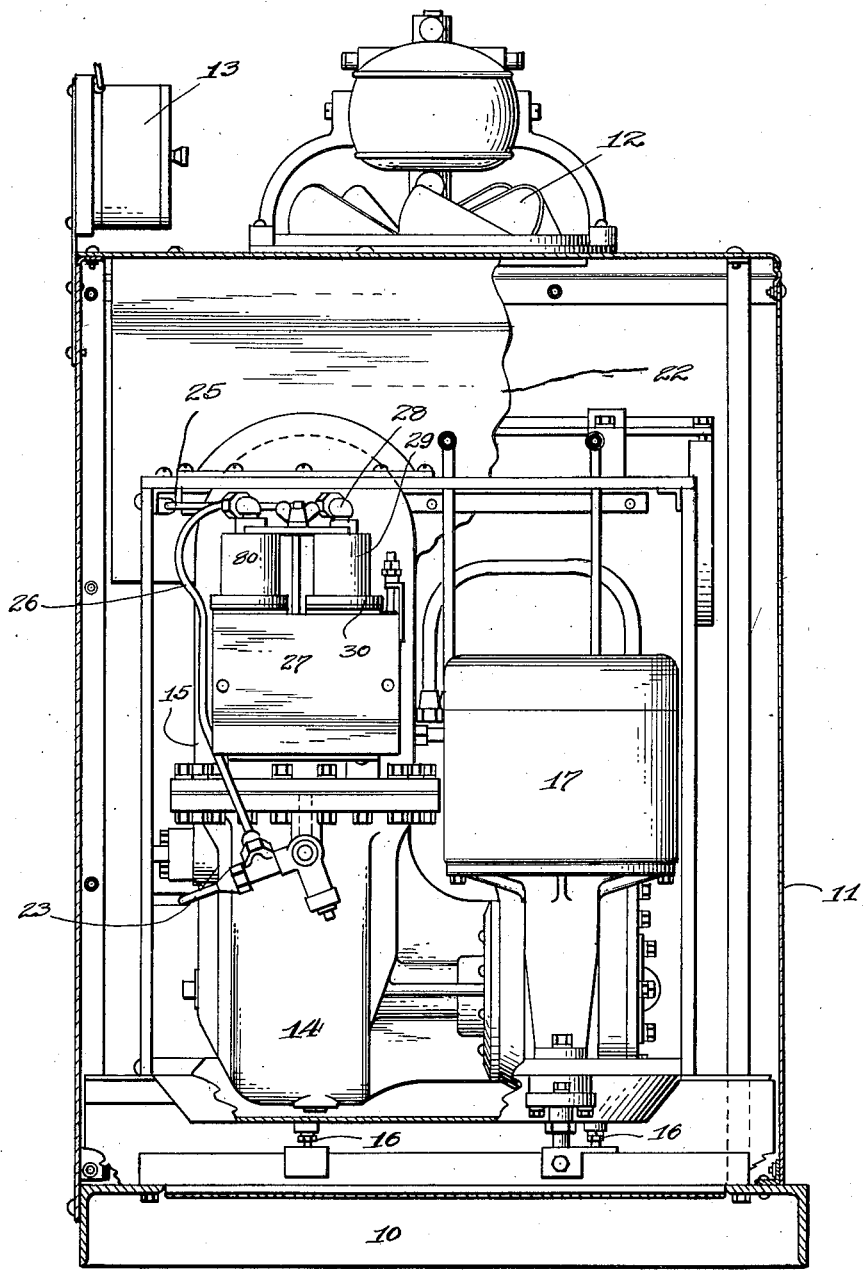
Figure 2 is a side elevation of the same.

Referring now to the drawings by characters of reference, 10 represents a base upon which a mechanical refrigerating apparatus of the compressor-condenser-evaporator type is mounted. The refrigerating apparatus illustrated is of the unitary type and is substantially enclosed by a casing 11 through which air is circulated by the electrically driven fan 12 supported upon the top of the casing. A thermostat 13 is carried by the casing and is connected to automatically control the fan operation in accordance with predetermined temperature conditions.

A crank case 14 supporting the compressor-condenser unit 15 is mounted upon a balancing support 16 which is secured upon the base 10 within the casing. The compressor is arranged interiorly of the condenser and suitable water circulating coils (not shown) extend into the condenser dome. The compressor is driven by the electric motor 17 secured upon the crank case and suitable gearing 18 transmits power from the motor shaft to the compressor crank shaft 19.

An evaporator 20 is arranged in a plane parallel to the compressor-condenser unit and is carried by a bracket 21 which is secured to one side of the compressor-condenser unit. The casing 11 is provided with apertures and a deflector 22 so that air from the chamber to be cooled can be directed through the casing in direct contact with the evaporator. The evaporator is connected with the condenser by the feed conduit 23 and with the crank case by the return conduit 24. The evaporator is preferably flooded with liquid refrigerant, such as sulphur dioxide, which travels in a circuit through the apparatus. A conduit 25 leads from the interior of the evaporator, above the liquid refrigerant level, to connect the low side with motor control mechanism, and a conduit 26 establishes communication between the condenser and motor control mechanism.

The motor control mechanism is preferably supported by the switch box 27 which is secured to the compressor-condenser unit. The control conduit 25 is connected to a union 28 which screws into an opening in the upper end of a rigid cylinder 29. The lower flanged end 30 of the cylinder 29 is secured to the head or plate 31 having its central portion depressed to engage an opening 32 in a plate 33 seated on the top of the switch box 27. A corrugated longitudinally compressible member or metal bellows 34 has its lower end rigidly connected to a stationary head 35, which is clamped between the plate 33 and the flange 30, and having its upper end closed by the cap 36 with which it is rigidly connected. The lower side of the cap 36 is provided with an extension having a circular recess therein to receive the upper end of a plunger 37 which is secured therein by any suitable means, such as solder. The plunger 37 extends downwardly through an aperture in the nut 38 which is screwed into an aperture in the depression in the plate 31. A saddle 39 is fitted over the reduced upper end of the nut 38. This saddle is provided with a laterally extending flange 40 on which is seated the spring 41, the upper end of which engages the flanged washer 42 which is loosely mounted on the plunger 37. The spring 41 tends to maintain the bellows 34 in extended position. The lower end of the nut 38 is provided with the recess 43 in which is mounted a spring 44 which surrounds the plunger 37 and is held compressed by nuts 45 which are screwed upon a threaded portion of the plunger. The tension of the spring 41 may be varied by adjusting the nut 38 which is secured in adjusted position by the nut 46. The tension of the spring 41 may also be varied or adjusted by means of nuts 45 which are employed to vary the tension of the spring 44, which, it will be observed, operates in opposition to the spring 41. A sleeve 47 may be employed to limit the downward movement of the plunger 36.

The pressure of the vaporous refrigerant in the evaporator 20 will operate through the top of the cylinder 29 to depress the cap 36 and the plunger 37 connected thereto. The amount of pressure necessary to operate the plunger 37 for moving the switch will depend upon the adjustments of the springs 41 and 44 as pointed out above.

The lower end of the plunger 37 operates the lever 48 for controlling the electric switch, in the following manner. The channel shaped lever 48 is provided with an aperture through its web portion. An inverted U-shaped member 49 is secured to the lever 48 and has an aperture in its web portion in alignment with the aperture through the lever 48. A reduced portion 50 of the plunger 37 slidably engages in the said apertures and its lower end contacts a flat spring 51 secured in the channel of the lever 48 by means of the bolt 52. A shoulder 53 on the plunger 37, formed by the reduced portion 50, is adapted to engage the member 49 to limit the extent of the flexing of the spring 51. A head 54 on the lower end of the plunger is adapted to engage the U-shaped member 49 to elevate the lever 48 and open the switch. The lever 48 is pivoted at its intermediate portion as at 55 to a depending member 56 carried by the switch box 27. The inner end of a channel shaped lever 48 is connected by a pin and slot connection 57 to an offset portion of the arm 58, which, in turn is pivoted to the lower bifurcated end of an adjusting member 59. The upper end of the adjusting member 59 is screw-threaded and is adapted to engage a nut 60 swivelly mounted on a projection 61 on the box 27. By means of the nut 60 the adjusting member 59 may be raised or lowered to properly adjust the operating arm 58 to vary the throw thereof to centralize with the travel of the plunger 37. A lock nut 62 may be employed to hold the parts in adjusted position. A lug 63 on an intermediate portion of the arm 58 is adapted to engage the pivot 55 between the flanges of the lever 48 to limit the upward movement of said arm.

The arm 58 is adapted to operate an electric switch of any suitable form. The one shown belongs to the "snap switch" type which is contained in the switch box 27, and consists of a base plate 64 on which is mounted the contact members 65 to which the electric leads 66, leading to the motor 17 and a source of electric energy, are connected in the usual manner. A pair of spaced posts 67 are secured to the base plate 64 and have pivoted on opposite sides thereof as by knife edges, the bifurcated ends of arms 68 and 69. The arm 69 is provided with backwardly bent extensions 70 to the free ends of which are secured flat springs 71 carrying the contact plate 72. The springs 71 will give the contact plate 72 a slight sliding movement when it first comes in engagement with the contact members 65, which operates to maintain the contact surfaces clean. The arm 68 is pivotally secured to a link 73 which in turn, is pivotally secured to the free end of the arm 58. Two springs 74 connect the arms 68 and 69. When the link 73 is lowered from the position shown in Figure 3, the springs will be carried below the pivotal points of these arms, and will, when they pass dead center, snap the contact plate 72 into engagement with the contact members 65. When the link 73 is elevated, the reverse operation takes place. The arm 69 is limited in its upward movement by means of a latch 75 which will extend beyond the forward edge of the slot 76 in the arm 69. When the arm 69 is in lowered position, the rear edge of the slot 76 is engaged by a notch 76ª carried by the latch 75. When the contact member 72 is in lowered position, it is held in such position by means of the notch 76 holding the member 69 until an extension 77 of the arm 68 engages a toe-piece 78 on the latch 75 and releases the same by rocking it against the tension of the spring 79 which is held stationary at the end removed from the latch 75, thus permitting the springs 74 to snap the contact plate 72 away from the contact members 65.

Figure 3:
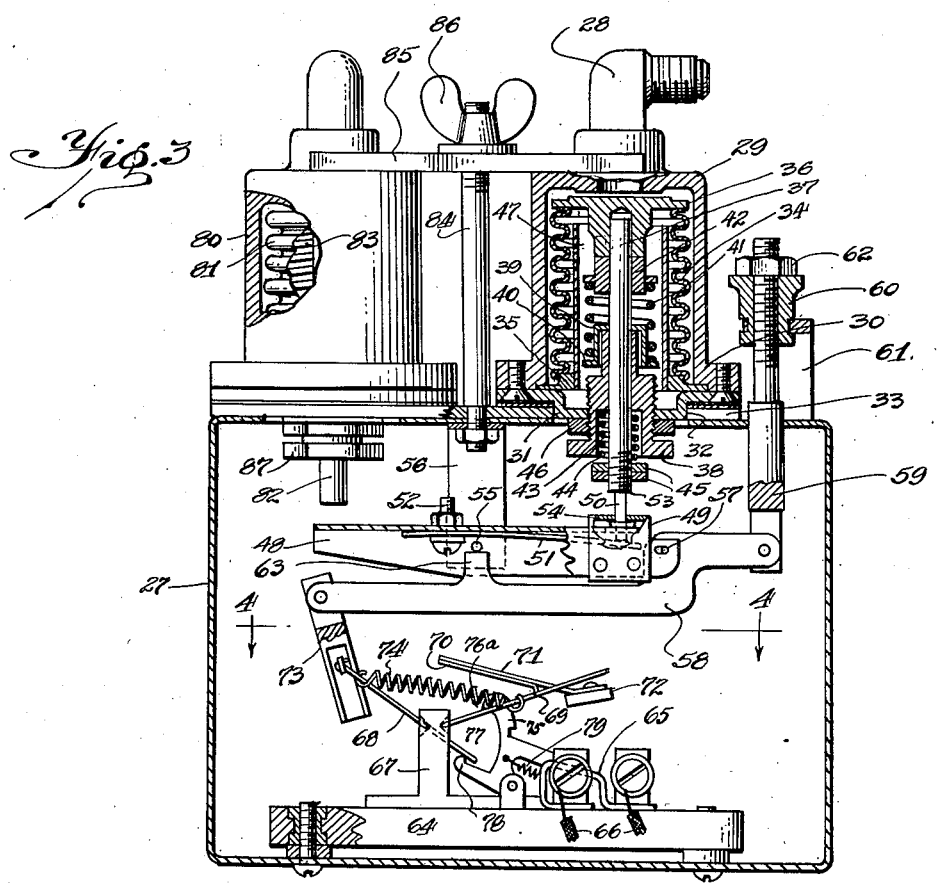
Figure 3 is a partial sectional view of the switch mechanism for controlling the motor.
Figure 4:
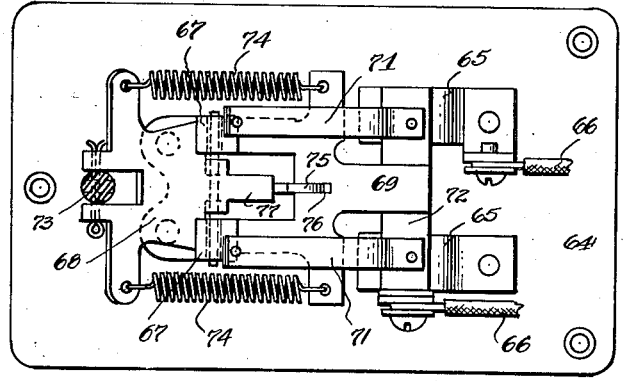
Figure 4 is a sectional view of the switch mechanism taken on line 4—4 of Figure 3.

In the operation of the device, assuming that the parts are in the position shown in Figure 3, the plunger 37 will be forced downward as the pressure in the evaporator 20 increases due to a rise in the temperature. The descent of the plunger against the spring 41 will cause the lever 48 to move downward thus causing a downward movement of the arm 58 to throw the switch and start the motor.

It sometimes happens in mechanical refrigerators of the compression type that the pressure in the condenser becomes excessive, as for instance, when the supply of cooling medium is stopped for any reason. It is necessary to provide means for stopping the motor under such conditions. In the form shown more or less diagrammatically in Figure 3, a device is provided which in all essential details is substantially the same as that just described as operated by the pressure in the low side of the system. The cylinder 80 has attached thereto the conduit 26, which is in communication with the high pressure side of the condenser. A corrugated, longitudinally, compressible member or bellows 81 similar to the corresponding member 34 is adapted to be compressed by the pressure of the liquid refrigerant in the passage 26. The plunger 82 is secured to the upper end of the bellows in the same manner as the corresponding plunger 37. A spring 83 within the bellows 81 tends to maintain the plunger 82 in elevated position. When the pressure on the upper end of the bellows 81 becomes excessive the plunger 82 will move downwardly against the compression of the spring and will come in contact with the free end of the lever 48, which, in turn, will elevate the arm 58, the spring 51 permitting such movement. As the arm 58 moves upward it carries the link 73 upward to thus open the switch and stop the motor. The cylinders 29 and 80 are secured in position on the switch box 27 by means of a bolt 84 secured to the switch box. This bolt passes through a yoke 85 which engages the upper ends of the said cylinders and a wing nut 86 is screwed on the bolt to clamp the yoke against the top of the cylinders.

Upward adjustment of the nut 38 will increase the tension placed upon the coil spring 41 and require a greater refrigerant pressure against the cap 36 in order to operate the switch closing mechanism. Likewise, by moving the nut 38 downwardly the tension of the spring 41 is decreased and the cap 36 can be moved downwardly by reducing refrigerant pressure to operate the switch mechanism for closing the circuit and operating the motor which drives the compressor. It will thus be seen that the nut 38 can be adjusted to exert a pressure against the cap so that a predetermined refrigerant pressure must be present in the evaporator 20 in order to move the contact member 72 against the contact 65 in order to close the circuit and operate the motor which drives the compressor. As the refrigerant pressure in the evaporator increases in a definite relation with the temperature of the atmosphere externally of the evaporator, the refrigerant pressure in the evaporator can be utilized to close the switch mechanism in order to operate the compressor at a predetermined temperature. By adjusting the nuts 45 upwardly on stem 37 the spring 44 will be compressed and will slow up the motion of the stem and the switch operating mechanism associated therewith, as the refrigerant pressure in the cylinder 29 and the evaporator 20 is reduced relative to that at which it moves the stem 37 downwardly to close the switch mechanism. The more the spring 44 is compressed the slower the upward movement of the stem 37 will be, and therefore, by adjusting the nuts 45 upwardly or downwardly the pressure at which the stem 37 will be moved to open the switch can be definitely determined. The adjustment of the nuts 45 will therefore provide a temperature range which can be definitely adjusted as desired so that the switch will remain closed until the temperature surrounding the evaporator 20 is lowered a predetermined degree below that at which the switch mechanism is automatically closed. In this manner the switch is opened or closed automatically by mechanism which is operated by predetermined refrigerant pressure conditions within the evaporator 20.

The adjusting member 59 is provided to raise or lower the arm 58 in order to provide for inaccuracies and variances in manufacture of the switch operative mechanism so that the fulcrum point of the lever 48 can be uniform in quantity production. The adjusting member 59 is accurately positioned when the switch control mechanism is assembled and is not further adjusted unless the switch mechanism is disassembled.

The stem 82 is moved downwardly by a predetermined refrigerant pressure within the condenser, or the high side of the refrigerating apparatus, and is arranged to act as a safety means for automatically operating the switch operating mechanism to break the circuit leading to the motor for driving the compressor when a predetermined abnormal pressure is present in the high side of the system. The nut 87, which corresponds and functions similarly to the nut 38, can be adjusted to increase or decrease the tension of the coil spring 83 normally exerting upward pressure against the bellows 81 so that by increasing the tension of the spring 83 greater pressure within the condenser will be required to move the plunger 82 downwardly to open the switch and likewise by reducing the tension of the spring 83 less pressure of the refrigerant in the condenser is required to move the plunger 82 downwardly to open the switch. The mechanism operated by the pressure in the high side of the system rocks the lever 48 upon its pivot 55 and thus transmits contact opening movement to the arm 58.

It will be seen that I have provided switch operating mechanism which is automatically actuated by predetermined excessive pressure in the high side of the system to open the switch, and which is also operated by predetermined pressures within the low side of the refrigerating apparatus to open and close the switch. It will further be seen that the switch mechanism operated by pressure in the low side of the refrigerating apparatus can be readily adjusted so that the switch mechanism will close at a desired pressure and will open at a desired pressure less than that at which it closes.

What I claim is:

1. In a refrigerating system having a motor driven compressor, an automatic motor control comprising a switch through which the motor circuit extends, mechanism for opening and closing said switch, a bellows actuated by the pressure in the low side of the refrigerating system, a member connected with the bellows for actuating the switch opening and closing mechanism, an adjustably disposed support for the member, and a pair of oppositely disposed resilient elements associated with the support and the member for determining the operational characteristics of the bellows.

2. A switch control mechanism comprising a bellows adapted to be actuated by differential fluid pressures, means for supporting one end of the bellows, a switch operating rod projecting within the bellows and secured at one end to the movable end thereof, an adjustable nut provided with a centrally disposed aperture for slidably supporting the rod intermediate its ends, and oppositely disposed resilient members operatively associated with the opposite ends of the rod and the nut.

In testimony whereof, I hereunto affix my signature.

JOHN R. REPLOGLE.